(12) United States Patent
Kraus et al.

(10) Patent No.: US 12,470,017 B2
(45) Date of Patent: Nov. 11, 2025

(54) PLUG-TYPE CONNECTOR PART WITH A HANDLE ELEMENT FOR STEERING THE MOVEMENT

(71) Applicants: Siemens Healthineers AG, Erlangen (DE); ODU GmbH & Co. KG, Mühldorf (DE)

(72) Inventors: Wolfgang Kraus, Nuremberg (DE); Thomas Kundner, Höchstadt (DE); Michael Bühn, Gars (DE); Stefan Franzl, Töging (DE); Andreas Heinz, Albaching (DE); Markus Seidl, Kastl (DE); Dominik Weichselgartner, Vilsbiburg (DE)

(73) Assignees: Siemens Healthineers AG, Erlangen (DE); ODU Gmbh & Co. KG, Muhldorf (DE)

( * ) Notice: Subject to any disclaimer, the term of this patent is extended or adjusted under 35 U.S.C. 154(b) by 225 days.

(21) Appl. No.: 17/603,575

(22) PCT Filed: May 9, 2019

(86) PCT No.: PCT/EP2019/061932
§ 371 (c)(1),
(2) Date: Oct. 13, 2021

(87) PCT Pub. No.: WO2020/224785
PCT Pub. Date: Nov. 12, 2020

(65) Prior Publication Data
US 2022/0200206 A1    Jun. 23, 2022

(51) Int. Cl.
*H01R 13/631* (2006.01)
*G01R 33/36* (2006.01)
(Continued)

(52) U.S. Cl.
CPC .......... *H01R 13/631* (2013.01); *G01R 33/36* (2013.01); *H01R 12/91* (2013.01); *H01R 13/24* (2013.01);
(Continued)

(58) Field of Classification Search
CPC .. H01R 13/631; H01R 13/24; H01R 13/6272; G01R 33/36
(Continued)

(56) References Cited

U.S. PATENT DOCUMENTS 3,399,372 A    8/1968   Uberbacher
3,587,029 A    6/1971   Knowles
(Continued)

FOREIGN PATENT DOCUMENTS

DE    102006000927 A1    4/2007
DE    102014007544 A1    11/2015
(Continued)

OTHER PUBLICATIONS

International Search Report and the Written Opinion for International Patent Application PCT/EP2019/061932 mailed Feb. 7, 2020.

*Primary Examiner* — Gary F Paumen
(74) *Attorney, Agent, or Firm* — Harris Beach Murtha Cullina PLLC

(57) ABSTRACT

A plug-type connector part is described. The plug-type connector part includes a rear part and an insertion part attached to or integrally formed with the rear part. The insertion part extends from the rear part in a mating direction of the plug-type connector part. The insertion part includes a plurality of contact elements. The plug-type connector part includes a handle element attached to or integrally formed with the rear part. The handle element is located opposite of the insertion part and faces the insertion part, with an interspace between the handle element and the insertion part.

19 Claims, 7 Drawing Sheets

(51) Int. Cl.
    *H01R 12/91*     (2011.01)
    *H01R 13/24*     (2006.01)
    *H01R 13/627*     (2006.01)
    *H01R 13/6582*     (2011.01)

(52) U.S. Cl.
    CPC ..... *H01R 13/6272* (2013.01); *H01R 13/6582* (2013.01)

(58) Field of Classification Search
    USPC .......................................... 439/248, 326, 342
    See application file for complete search history.

(56) References Cited

U.S. PATENT DOCUMENTS

| | | |
|---|---|---|
| 10,103,471 B1 | 10/2018 | Adachi et al. |
| 2004/0106336 A1 | 6/2004 | Menon |
| 2005/0101163 A1 | 5/2005 | Obikane et al. |
| 2006/0189180 A1* | 8/2006 | Lang ................. H01R 12/7005 439/76.1 |
| 2010/0136849 A1 | 6/2010 | Kato |
| 2011/0230066 A1* | 9/2011 | Ukawa ................ H01R 13/627 29/874 |
| 2013/0089991 A1 | 4/2013 | Ito |
| 2018/0088192 A1 | 3/2018 | Kundner et al. |
| 2018/0301840 A1* | 10/2018 | Adachi .............. H01R 13/2442 |
| 2019/0237907 A1 | 8/2019 | Wagner et al. |

FOREIGN PATENT DOCUMENTS

| | | |
|---|---|---|
| EP | 1531527 B1 | 6/2007 |
| EP | 2367240 A2 | 9/2011 |
| EP | 3522306 A1 | 8/2019 |
| WO | 2006091255 A1 | 8/2006 |

* cited by examiner

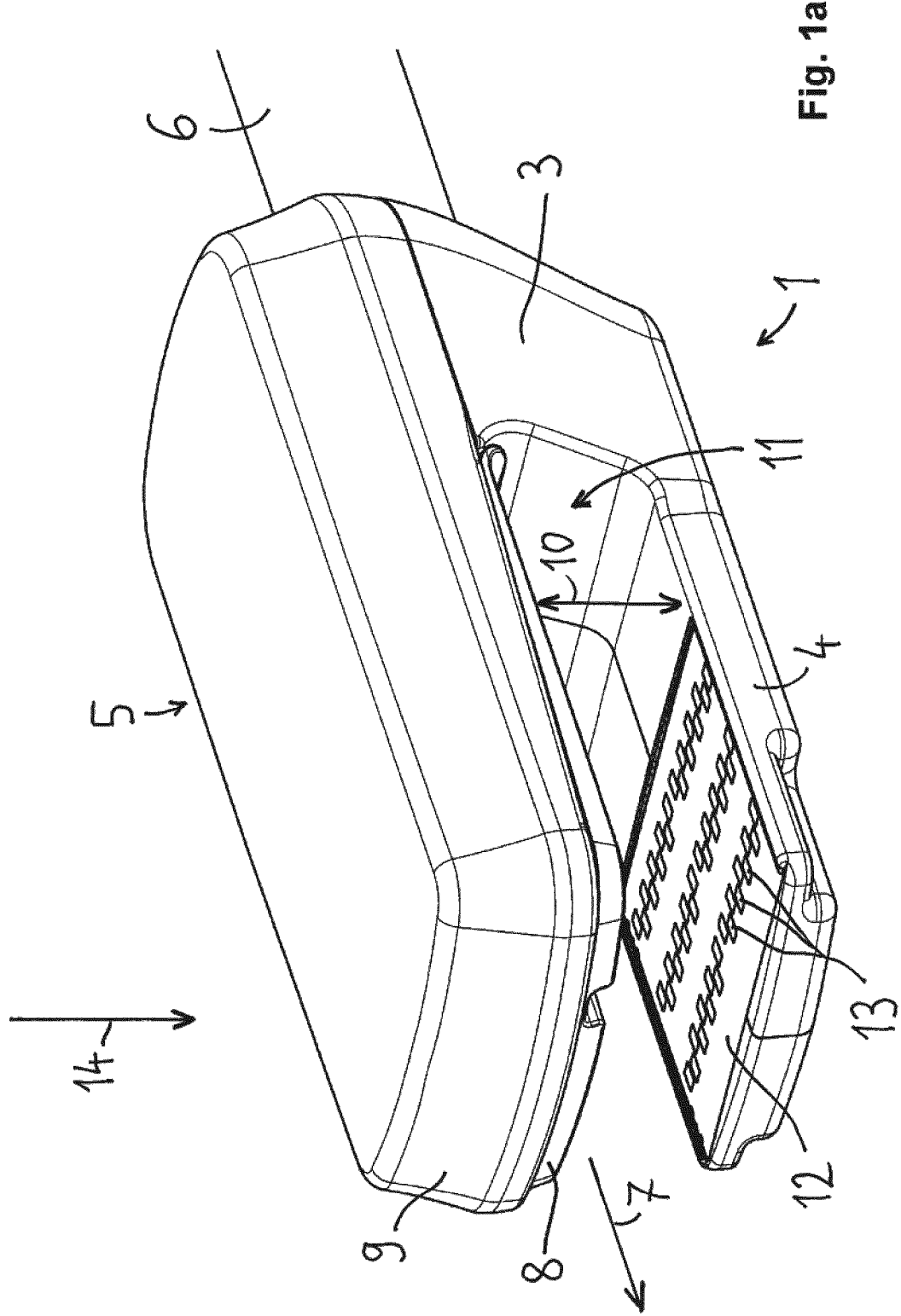

PLUG-TYPE CONNECTOR PART WITH A HANDLE ELEMENT FOR STEERING THE MOVEMENT

This application is the National Stage of International Application No. PCT/EP2019/061932, filed May 9, 2019. The entire contents of this document are hereby incorporated herein by reference.

FIELD

The present embodiments relate to a plug-type connector part and to a plug-in connector including a plug-type connector part and a socket-type connector part. The present embodiments further relate to a socket-type connector part, a local coil for a magnetic resonance imaging device, an amplification device, a patient positioning device, and a magnetic resonance imaging arrangement.

BACKGROUND

From U.S. Pat. No. 3,399,372, an arrangement that includes a printed circuit card and a socket receiving the card is known. The printed circuit card has narrow, closely spaced, alternated ground and signal contact tabs, while the socket has signal contacts formed from wire and ground contacts formed from sheet metal.

A similar arrangement is known from U.S. Pat. No. 3,587,029, where a socket-type connector includes a row of interspaced resilient signal and ground contact members disposed in a recess in the connector body and adapted to make contact with the terminals of the plug-in board when the board is inserted in the recess.

US Patent Application publication No. 2010/0136849 discloses a connector including pairs of signal contacts and pairs of ground contacts disposed in a housing of the connector along a predetermined arranging direction. The contacts have spring sections that may press contact portions of the contacts against the electrodes of a card-type electronic device.

Similarly, European Patent No. EP 1531527 describes a connector having a contact group and an insulator for holding the contact group. The contact group includes pairs of signal contacts and pairs of ground contacts, where each pair of signal contacts is arranged adjacently between the ground contacts of a pair of ground contacts.

SUMMARY AND DESCRIPTION

The scope of the present invention is defined solely by the appended claims and is not affected to any degree by the statements within this summary.

The present embodiments may obviate one or more of the drawbacks or limitations in the related art. For example, a plug-type connector part, a plug-in connector, and a socket-type connector part that allow for an improved handling and for a more precise navigation of the plug-type connector part relative to a socket-type connector part (e.g., for connecting a device for magnetic resonance imaging, such as a magnetic resonance local coil) are provided. As another example, a plug-type connector part, a plug-in connector, and a socket-type connector part that may be cleaned in a simple manner are provided.

According to the present embodiments, a plug-type connector part may include a rear part and an insertion part attached to or integrally formed with the rear part. The insertion part extends from the rear part in a mating direction of the plug-type connector part. The insertion part includes a plurality of contact elements. The plug-type connector part includes a handle element attached to or integrally formed with the rear part. The handle element is located opposite of the insertion part and faces the insertion part, with an interspace between the handle element and the insertion part.

The plug-type connector part according to embodiments includes an insertion part with a plurality of contact elements. The insertion part is configured for being inserted into an insertion slot of a socket-type connector part. By inserting the insertion part into the insertion slot, a plurality of electrical connections may be established between contact elements of the plug-type connector part and corresponding contact elements of the socket-type connector part. In order to facilitate the handling of the plug-type connector part for a user, a handle element is attached to or integrally formed with the rear part of the plug-type connector part. Herein, the term "rear part" relates to the mating direction of the plug-type connector part. The handle element is disposed opposite of the insertion part, with an interspace between the handle element and the insertion part. The handle element may, for example, be located above the insertion part.

In one embodiment, the user may place a hand on the handle element and move the plug-type connector part in a desired direction. In this regard, the handling of the plug-type connector part according to embodiments may be similar to the operation of a computer mouse on a mouse pad. As a result, the plug-type connector part may be operated most intuitively by the user. The handle element of one or more of the present embodiments is implemented as a grip body that may be easily gripped by the user. The user may, for example, slide the plug-type connector part in the mating direction and insert the insertion part into the corresponding insertion slot. In this regard, the handle element allows for a precise control of movement of the plug-type connector part. In one embodiment, the orientation of the handle element indicates to the user the mating direction for inserting the insertion part into the insertion slot.

In a scenario of one or more of the present embodiments, the plug-type connector part and the plug-in connector are used in an orientation in which the handle of the plug-type connector part is located above the insertion part when viewed in the vertical direction. For convenience, this orientation is in the following referred to as the "regular orientation". In this context, the "vertical" direction is defined as the direction of gravity. The handle may be arranged above the insertion path that the user may grip the handle in a particularly convenient manner. In the following description, terms such as "over", "under", "above", "below", "top", "bottom", "upward", "downward" will be used with respect to this regular orientation of the plug-type connector part and the corresponding orientation of the socket-type connector part.

According to the present embodiments, a plug-in connector may include a plug-type connector part as described above and a corresponding socket-type connector part. The plug-type connector part is configured for being plugged into the socket-type connector part. The socket-type connector part includes an insertion slot. The insertion slot is configured for taking in the insertion part of the plug-type connector part when the plug-type connector part is plugged into the socket-type connector part. The socket-type connector part further includes a connector module with a plurality of contact elements. The connector module is arranged adjacent to the insertion slot. The plurality of contact elements of the connector module are configured for establishing electrical connections with corresponding contact elements of the insertion part when the plug-type connector part is plugged into the socket-type connector part and the insertion part is accommodated in the insertion slot. For ease of assembly and repair, the connector module may be self-contained, and may be detachable from the socket-type connector part.

According to the present embodiments, a socket-type connector part may include an insertion slot. The insertion slot is configured for taking in an insertion part of a plug-type connector part when the plug-type connector part is plugged into the socket-type connector part. The socket-type connector part includes a connector module with a plurality of contact elements. The connector module is arranged adjacent the insertion slot. The contact elements of the connector module are configured for establishing electrical connections with corresponding contact elements of the insertion part when the plug-type connector part is plugged into the socket-type connector part and the insertion part is accommodated in the insertion slot.

The plug-type connector part, the plug-in connector, and the socket-type connector part as described above are configured such that the cleaning or disinfection process of these parts is simplified. For example, this is very important in a medical environment (e.g., at a magnetic resonance imaging arrangement). For example, it is possible to configure these parts in a way that there are no or only a few recesses, grooves, or protruding elements. Accordingly, the plug-type connector part, the plug-in connector, and the socket-type connector part may be produced with smooth surfaces that allow for a more efficient cleaning process.

According to the present embodiments, a local coil for a magnetic resonance imaging device may include a plug-type connector part as described above. According to the present embodiments, an amplification device may include an amplification unit including at least one amplifier, an interface for connecting a local coil for a magnetic resonance imaging device to the amplification unit, and a plug-in connector part as described above. In one embodiment, the local coil and/or the amplification device may be connected to the magnetic resonance imaging device conveniently and safely via the plug-type connector part.

According to the present embodiments, a patient positioning device may include a socket-type connector part as described above. In one embodiment, devices (e.g., a local coil and/or an amplification device) may be connected to the patient positioning device conveniently and safely via the socket-type connector part.

According to the present embodiments, a magnetic resonance imaging arrangement may include a local coil connected to a plug-type connector part and a magnetic resonance imaging device connected to a socket-type connector part. The plug-type connector part and the socket-type connector part form a plug-in connector.

Features of the present embodiments that may be applied alone or in combination are discussed below.

In one embodiment, the handle element is a grip body that may be grasped to hold and move the plug-type connector part in any direction. In one embodiment, for navigating the plug-type connector part, the user may put his hand around the grip body and moves the plug in the desired direction. For example, the user may direct the insertion part into the insertion socket. The handle element of one or more of the present embodiments is configured for being gripped by the user in order to move the plug-type connector part into a socket-type connector part. With this embodiment, the hand of the user may conveniently rest on the grip body, which may allow for a precise control of movement of the plug so that the user may easily navigate the plug in a desired direction.

In one embodiment, when viewed from a lateral side of the plug, the handle element has a trapezoidal shape so that the handle element extends over the insertion part. In one embodiment, this may entail a handle element of larger size. Such larger handle element may be easy to be gripped by the user. A larger handle element may more effectively protect the insertion part and contact elements located on the insertion part.

In one embodiment, the handle element, the rear part, and the insertion part of the plug-type connector part when assembled are C-shaped. In the embodiment, the handle element forms a first leg, and the insertion part forms a second leg of the C-shaped plug-type connector part. In one embodiment, the length of the first leg is between 60% and 140% (e.g., between 80% and 120%) of the length of the second leg. Both the handle element and the insertion part may extend in the mating direction. The length of the handle element of one or more of the present embodiments approximately corresponds to the length of the insertion part. This has the effect that when the front end of the insertion part is moved, the front end of the handle element moves by the same amount. This allows for a precise handling of the insertion part.

According to an embodiment of the plug-type connector part, the handle element extends from the rear part in a direction that deviates from the mating direction by at most 20° (based on a full circle of 360°), by at most 15°, by at most 10°, or by at most 5°. In one embodiment, the handle element extends from the rear part in the mating direction. It is an advantage of this embodiment that the handle element indicates to the user the intended direction of the movement of the plug for inserting the plug into the socket.

The insertion part of one or more of the present embodiments is a plate-shaped element that, for example, extends essentially in the mating direction. In one embodiment, the handle element extends essentially in parallel to the insertion part. In this context, the handle element and the insertion part are considered to extend "essentially in parallel" if the orientation of the handle element deviates by at most 10° from the orientation of the insertion part. Because of this essentially parallel orientation, the direction of movement of the handle element may correspond to the direction of movement of the insertion part (e.g., when the handle element is moved, the insertion part is moved in the same way). Thus, a precise control of the movement of the insertion part may be accomplished, and the insertion part may be inserted into the insertion slot without difficulties.

The height of the plug-type connector part of one or more of the present embodiments is more than 60% of the width of the plug-type connector part or more than 65%. The height of the plug-type connector part may, for example, be less than 100% of the width of the plug-type connector part, less than 90% of the width, or less than 80% of the width of the plug-type connector part. In one embodiment, this may provide for a particularly compact and easy-to handle connector part.

In the embodiment of the plug-type connector part, the rear part includes a cable port or a cable feed-through for a cable to be introduced into the plug-type connector part from a rear side of the plug-type connector. In one embodiment, the plug-type connector part includes a cable with a plurality of strands. Each strand of the plurality of strands is connected to a corresponding contact element of the plug-type connector part. The plug-type connector part of one or more of the present embodiments includes a plurality of contact elements, at least some of which are connected to respective strands of the cable. As a result, multiple electrical connections may be established in parallel. The plurality of contact elements may include both signal contact elements and shield contact elements. By providing at least one shield contact element in addition to the signal contact elements, signal distortion and cross talk between neighboring signal lines may be prevented or at least reduced. Accordingly, the quality of signal transmission is improved. For example, magnetic resonance signals may, for example, be received with a high signal-to-noise ratio.

The insertion part of the plug-type connector part of one or more of the present embodiments includes a contact face with the plurality of contact elements arranged on the contact face. In one embodiment, the contact face with the contact elements is disposed on a side of the insertion part that is located opposite of the handle element. In one embodiment, the contact face with the contact elements is disposed on the insertion part such that the contact face faces the handle element; in other words, the contact elements are oriented towards the interspace between the insertion part and the handle element. An advantage of this embodiment is that the contact elements are well protected from contamination and from damages. The insertion part of one or more of the present embodiments includes a printed circuit board. The printed circuit board may include the plurality of contact elements. This may provide for a particularly simple manufacture of the insertion part.

In an embodiment, the socket-type connector part includes a feeding element. When viewed in the mating direction of the plug-type connector part, the feeding element is arranged at the front end of the insertion slot and is configured for guiding the insertion part into the insertion slot. In an operation of mating the plug-type connector part with the socket-type connector part of one or more of the present embodiments, the insertion part of the plug-type connector part is first placed on the feeding element, and then, the plug-type connector part is moved in the mating direction, with the insertion part being guided by the feeding element into the insertion slot. The feeding element of one or more of the present embodiments is a tongue-like protrusion extending from the bottom of the insertion slot. An example of a feeding element is developed into a semitube- or basin-like shape by providing a lateral guide on one or both sides of the insertion slot. The lateral guide(s) extend(s) essentially perpendicularly to the tongue-like protrusion on the tongue-like protrusion's upper side. Due to the presence of the feeding element, the process of connecting and disconnecting the plug-type connector part and the socket-type connector part is simplified. In one embodiment, the insertion slot extends in the mating direction of the plug. Accordingly, when the plug is moved towards the socket in the mating direction, the insertion part is introduced into the insertion slot.

In an embodiment, the socket-type connector part includes a connector block. The connector block includes the connector module and the insertion slot. In one embodiment, the connector block is moveably mounted inside the socket-type connector part. In one embodiment, the connector block is resiliently mounted inside the socket-type connector part. The connector block may, for example, be resiliently supported by at least one spring element. In one embodiment, the connector block is configured for adapting to the position of the insertion part when the insertion part is inserted into the insertion slot.

In one embodiment, the connector block includes a slanted approach surface. In one embodiment, the slanted approach surface is located on the side of the insertion slot that is opposite to the connector module. In one embodiment, the slanted approach surface is configured for interacting with the insertion part when the insertion part is inserted into the insertion slot. Due to the slanted orientation of the approach surface, a smooth insertion process is accomplished. In one embodiment, the slanted approach surface is configured for guiding the insertion part into the insertion slot when the insertion part is inserted into the insertion slot. When the insertion part is completely inserted into the insertion slot, the insertion part may, for example, rest on a support surface of the connector block. By providing a stable mechanical support for the insertion part, the reliability of the electric connections between the contact elements of the insertion part and the contact elements of the connector module is improved. In an embodiment, the slanted approach surface is located below the insertion slot.

In an embodiment, the socket-type connector part includes at least one spring element configured for resiliently supporting the connector block. The resiliently supported connector block may adapt to the position of the insertion part when the insertion part is inserted into the insertion slot. In one embodiment, the spring force of the at least one spring element acts in an upward direction. The at least one spring element may, for example, be configured for resiliently pressing the slanted approach surface of the insertion slot against the insertion part when the insertion part is inserted into the insertion slot. In one embodiment, when the insertion part is inserted into the insertion slot, the connector block is pushed in a downward direction, and the spring element is resiliently compressed. Accordingly, the position of the connector block may be adapted to the position of the insertion part.

According to an embodiment, the socket-type connector part and the handle element are configured such that the handle element is disposed outside of the socket-type connector part when the plug-type connector part is plugged into the socket-type connector part. In one embodiment, when the plug-type connector part is plugged into the socket-type connector part, the handle element is disposed on top of the socket-type connector part. In the plugged-in state, the handle element is located outside of the socket-type connector part and remains accessible to the user. Accordingly, for unplugging the plug-type connector part, the user may grip the handle element and pull the plug-type connector part out of the socket-type connector part. Because the handle element remains accessible to the user during the entire process of mating and unmating the connector parts, mating and unmating is particularly intuitive and convenient.

In an embodiment, the connector module is located above the insertion slot. In one embodiment, this may contribute to reduce contamination of the connector module. In an embodiment, the plurality of contact elements of the connector module are disposed at the bottom of the connector module, while the contact elements of the insertion part may be located on the upper side of the insertion part that faces the handle element.

In an embodiment, the connector module is pushed in a downward direction when the plug-type connector part is plugged into the socket-type connector part, and the insertion part is accommodated in the insertion slot. In one embodiment, this downward direction includes an angle of more than 45° with the mating direction of the plug-type connector part. In one embodiment, this mechanism may facilitate the arrangement of the connector module above the insertion slot. The vertical distance between the connector module and the insertion opening may be increased when no plug-type connector part is plugged into the socket-type connector part. Thereby, the risk of possible liquids entering the insertion opening causing short circuits at the connector module may be reduced.

In one embodiment, the connector module includes both signal contact elements and shield contact elements. By providing at least one shield contact element in addition to the signal contact elements, signal distortion and cross talk between neighboring signal lines may be prevented or at least reduced. Accordingly, the quality of signal transmission is improved.

In one embodiment, the contact elements of the connector module are spring contact elements. When the insertion part is pressed against the connector module, the spring contact elements of the connector module are resiliently deformed. The resilient deformation of the spring contact elements improves the electric connection between the contact elements. In one embodiment, the connector module includes a contact surface with a plurality of contact elements that protrude from the contact surface. By pressing the insertion part against the contact surface, a plurality of electrical connections is set up in parallel.

In one embodiment, the insertion part of the plug-type connector part and the connector module of the socket-type connector part are configured for transmitting radio frequency (RF) signals (e.g., magnetic resonance signals). For example, via the contact elements of the connector module and the contact elements of the insertion part, a plurality of RF signals may be transmitted in a way that signal distortion caused by electromagnetic radiation, crosstalk, capacitive and inductive coupling, etc. is kept at a minimum. The plug-in connector of the present embodiments is suited for transmitting RF signals in the field of medical imaging (e.g., in magnetic resonance imaging (MRI)). In medical imaging, an imaging apparatus generates a plurality of RF signals that are to be transmitted from the imaging apparatus to an image processing unit. The plug-in connector of the present embodiments is capable of transmitting a plurality of these RF signals in parallel, with signal distortion being kept at a minimum. Therefore, image processing in the image processing unit may be based on high quality RF signals.

In one embodiment, when the plug-type connector part is plugged into the socket-type connector part, part of the socket-type connector part extends into the interspace between the insertion part and the handle element. Thereby, the mechanical stability of the plug-in connector in the plugged-in state may be increased. In one embodiment, the handle element includes a latching element facing towards the interspace of the plug. The socket-type connector part includes a counter-latching element located at a top surface, and the latching element is configured for engaging with the counter-latching element when the plug-type connector part is pushed into the socket-type connector part. Thus, when the plug-type connector part is plugged into the socket-type connector part and reaches a final position, the latching element engages with the counter-latching element. In an embodiment, the handle element includes a resiliently supported snap-in hook facing towards the interspace of the plug. The socket-type connector part includes a protrusion located at a top surface. The snap-in hook is configured for engaging with the protrusion when the plug-type connector part is pushed into the socket-type connector part.

In one embodiment, the insertion part, the rear part, and the handle element of the plug-type connector part are implemented as one or more injection molded parts. In one embodiment, the connector body and the upper cover of the socket-type connector part are implemented as injection molded parts. The handle element of one or more of the present embodiments includes a snap cover that may be snapped onto the body of the plug-type connector part. The snap cover may provide for a particularly simple assembly of the plug-type connector part.

In one embodiment, the plurality of contact elements of the socket-type connector part are inaccessible (e.g., untouchable) by a human body part (e.g., a finger). For example, the plurality of contact elements of the socket-type connector part are inaccessible by a human body part when the socket-type connector part is mounted and/or in an operating state and/or functional state. In one embodiment, the insertion slot has a width that is small enough to prohibit an insertion of a human body party. In one embodiment, the width of the insertion slot is less than 20 mm, less than 15 mm, less than 8 mm, less than 6 mm, or less than 4 mm. Hence, a supply voltage may be applied to the one or more contact elements continuously in a safe manner because the contact elements cannot be touched from outside. Thus, a control for switching the supply voltage is not necessary. This facilitates the design of a device in which the socket-type connector part may be integrated (e.g., a magnetic resonance device).

BRIEF DESCRIPTION OF THE DRAWINGS

FIG. 1a shows one embodiment of a plug-type connector part with a handle, a rear part, and an insertion part;

DETAILED DESCRIPTION

Figure 1B:
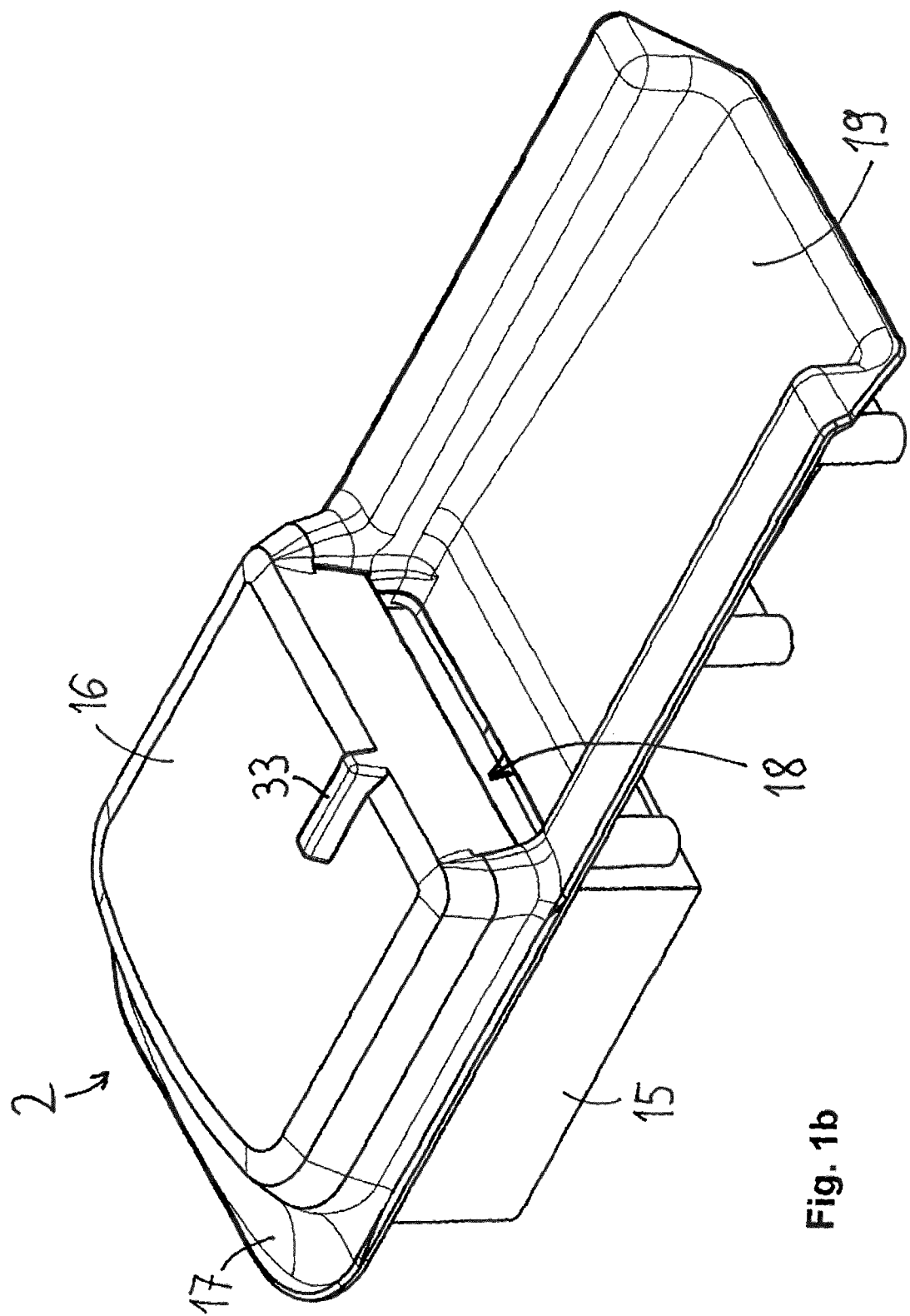
FIG. 1b shows one embodiment of a socket-type connector part with an insertion slot configured for accepting the insertion part of the plug.

In the following description of exemplary embodiments, same reference numerals denote same or comparable components.

In FIG. 1a, a plug-type connector part of a plug-in connector is shown, and in FIG. 1b, a corresponding socket-type connector part is depicted. The plug-type connector part 1 of FIG. 1a is configured for being mated with the socket-type connector part 2 of FIG. 1b. The plug-type connector part 1 includes a rear part 3, an insertion part 4, and a handle 5. A cable 6 is introduced into the rear part 3 via a cable port or a cable feed-through. The insertion part 4 is attached to or integrally molded with the rear part 3 and extends from the rear part 3 in the mating direction 7. The insertion part 4 may, for example, be implemented as a plate-shaped insertion part. The handle 5 is attached to or integrally molded with the rear part 3. In the example of FIG. 1*a*, the lower portion 8 of the handle 5 is integrally molded with the rear part 3, and a snap-on cover 9 is attached to the lower portion 8. The handle 5 may, for example, be implemented as a plate-shaped handle. The handle 5 extends from the rear part 3 in the mating direction 7. The handle 5 runs in parallel with the insertion part 4 and is arranged at a certain distance 10 from the insertion part 4, where an interspace 11 is formed between the insertion part 4 and the handle 5.

When viewed from the lateral side, the handle 5, the rear part 3, and the insertion part 4 form a C-shape, as shown in FIG. 1*a*. On the side of the insertion part 4 that faces the handle 5, a contact face 12 is arranged. The contact face 12 includes a plurality of contact elements 13. The plurality of contact elements 13 may, for example, include signal contact elements as well as shield contact elements. The plurality of contact elements 13 may be configured for transmitting a plurality of electrical signals in parallel (e.g., a plurality of RF signals). At least some of the signal contact elements 13 may, for example, be connected with corresponding cable strands of the cable 6. By arranging the contact face 12 on the side of the insertion part 4 that faces the handle 5, the contact face 12 with the contact elements 13 is to some extent protected by the handle 5. For example, when viewed in the vertical direction 14, the handle 5 extends beyond the insertion part 4 and serves as a cover for the insertion part 4.

Figure 5:
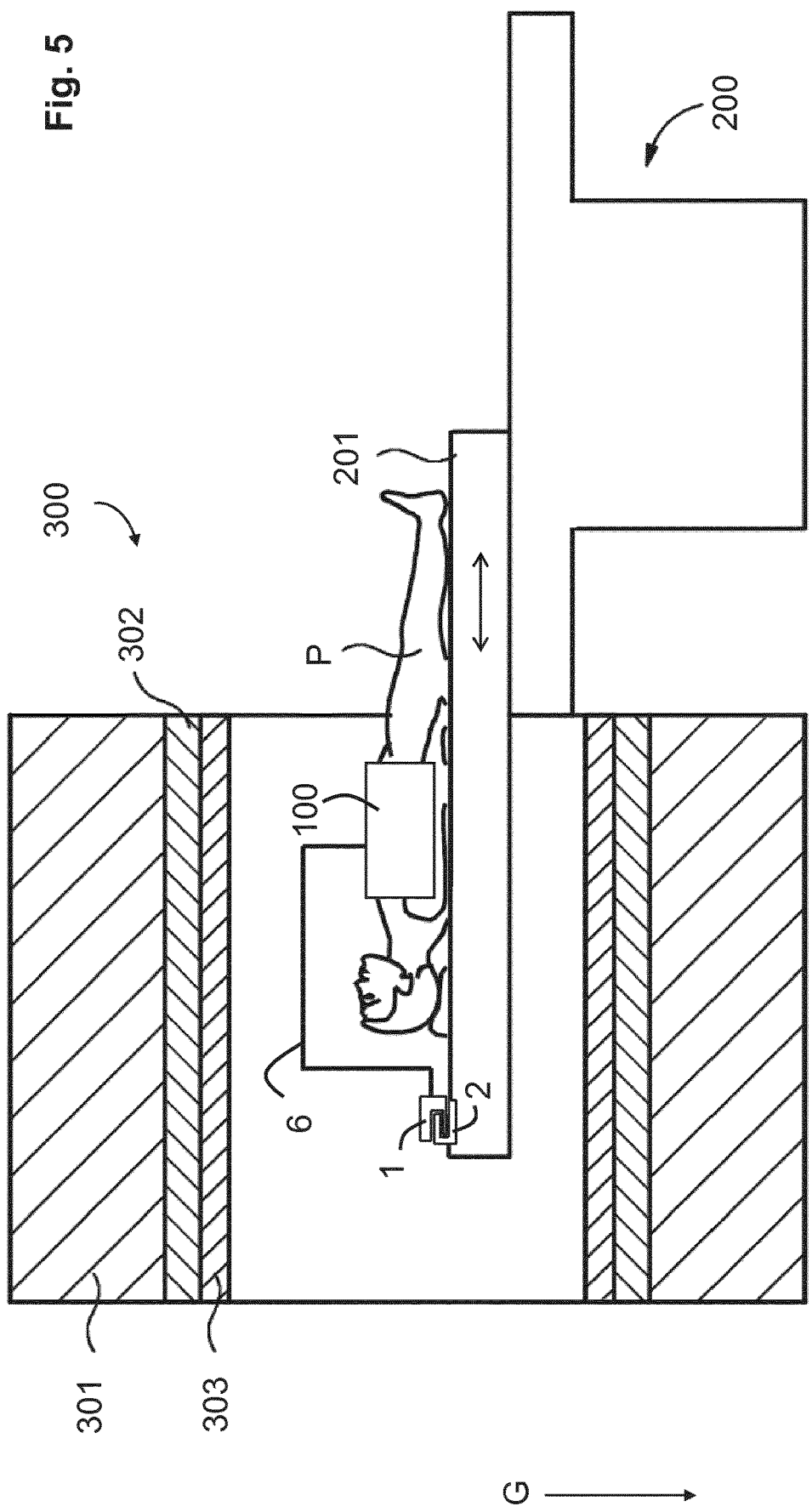
FIG. 5 is a schematic depiction of one embodiment of a magnetic resonance imaging arrangement including a local coil with a plug-type connector part, a patient positioning device with a socket-type connector part, and a magnetic resonance imaging device.

The socket-type connector part 2 shown in FIG. 1*b* includes a connector body 15 and an upper cover 16 with a flange 17. The socket-type connector part 2 may, for example, be mounted in a housing of an electrical apparatus (e.g., a patient positioning device as shown in FIG. 5). The socket-type connector part 2 includes an insertion slot 18 configured for accommodating the insertion part 4 when the plug-type connector part 1 is mated with the socket-type connector part 2. For plugging the plug-type connector part 1 into the socket-type connector part 2, a user may, for example, grip the handle 5 and slide the insertion part 4 into the insertion slot 18. In order to facilitate the mating process, the socket-type connector part 2 may optionally include a feeding element 19 disposed in front of the insertion slot 18 when viewed in the mating direction 7. The feeding element 19 may serve as a guide element for guiding the plug-type connector part 1. For example, the insertion part 4 may be placed on top of the feeding element 19 and may be slid into the insertion slot 18. During the insertion process, the handle 5 remains at the exterior of the socket-type connector part 2. When the plug-type connector part 1 is plugged into the socket-type connector part 2, the front part of the upper cover 16 will enter into the interspace 11 and the handle 5 will remain at the exterior of the socket-type connector part 2. In the plugged-in state, the handle 5 is disposed on top of the upper cover 16. Thus, the user may grip the handle 5 and unplug the plug-type connector part 1 and the socket-type connector part 2 by pulling the insertion part 4 out of the insertion slot 18.

In regular use, the handle 5 of the plug-type connector part 1 will be located above the insertion part 4 such that the user may grip the handle 5 in a convenient manner. In the following, terms like "over", "under", "above", "below", "top", "bottom", "upward", and "downward" will be used with regard to this regular orientation of the plug-type connector part 1.

Figure 2:
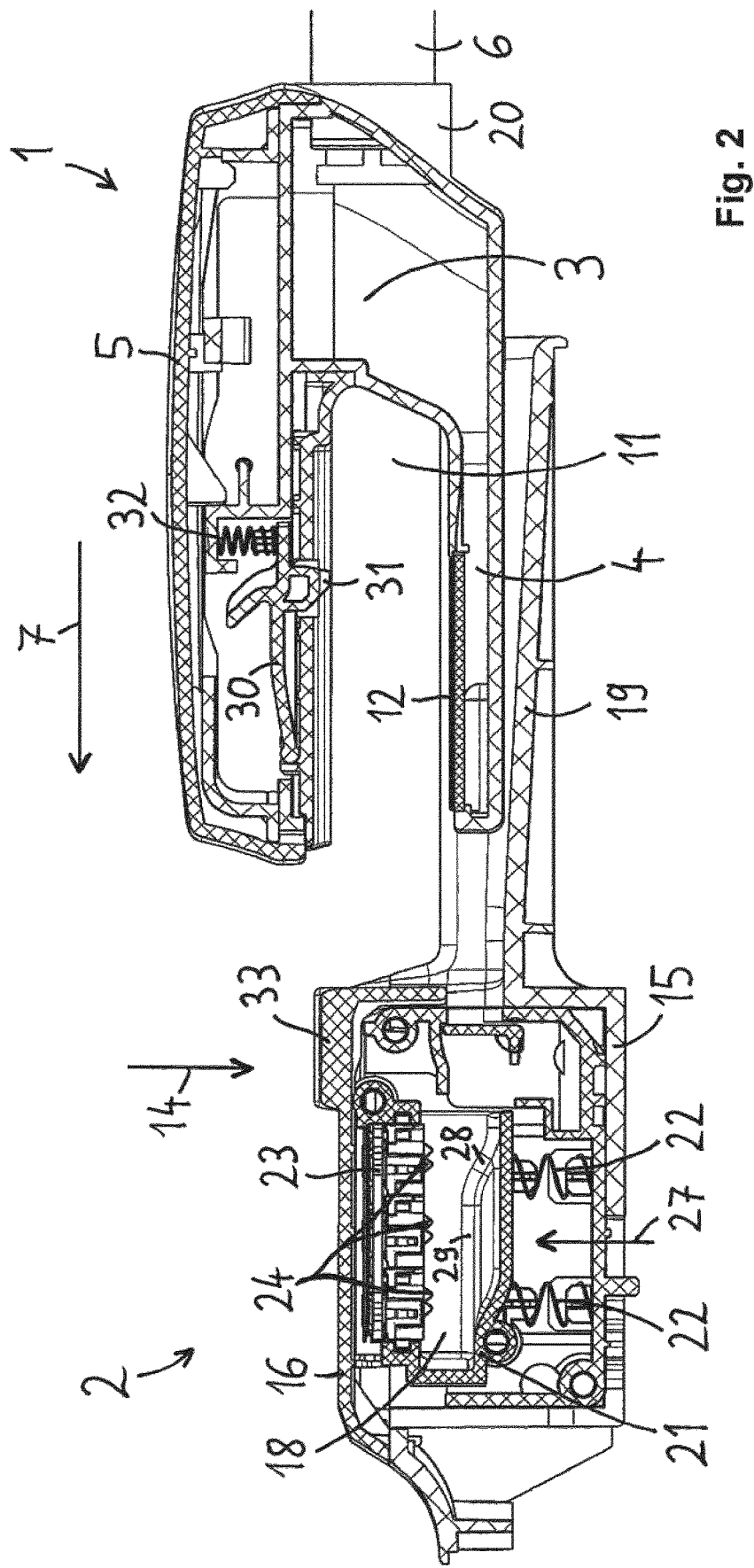
FIG. 2 is a longitudinal section of one embodiment of the plug-type connector part and the socket-type connector part in a position in which the plug-type connector part is not plugged in yet.

FIG. 2 shows a longitudinal section of the plug-type connector part 1 and the socket-type connector part 2 in a relative position in which the plug-type connector part 1 is not plugged into the socket-type connector part 2 yet. FIG. 2 shows that the handle 5, the rear part 3, and the insertion part 4 form a C-shape, where the handle 5 and the insertion part 4 extend in parallel in the mating direction 7. The cable 6 enters the rear part 3 of the plug-type connector part 1 via a cable feed-through 20.

The socket-type connector part 2 includes the connector body 15 and the upper cover 16. The insertion part 4 of the plug-type connector part 1 rests on the feeding element 19 and may be moved into the insertion slot 18 in the mating direction 7. Inside the connector body 15, a connector block 21 is resiliently mounted. As shown in FIG. 2, the connector block 21 is supported by a plurality of coil springs 22. The connector block 21 includes the insertion slot 18 and a connector module 23 that is arranged above the insertion slot 18. The connector module 23 includes a plurality of spring contact elements 24 configured for establishing electrical connections with corresponding contact elements 13 on the contact face 12 of the insertion part 4 when the plug-type connector part 1 is plugged into the socket-type connector part 2 and the insertion part 4 is disposed in the insertion slot 18.

Figure 3:
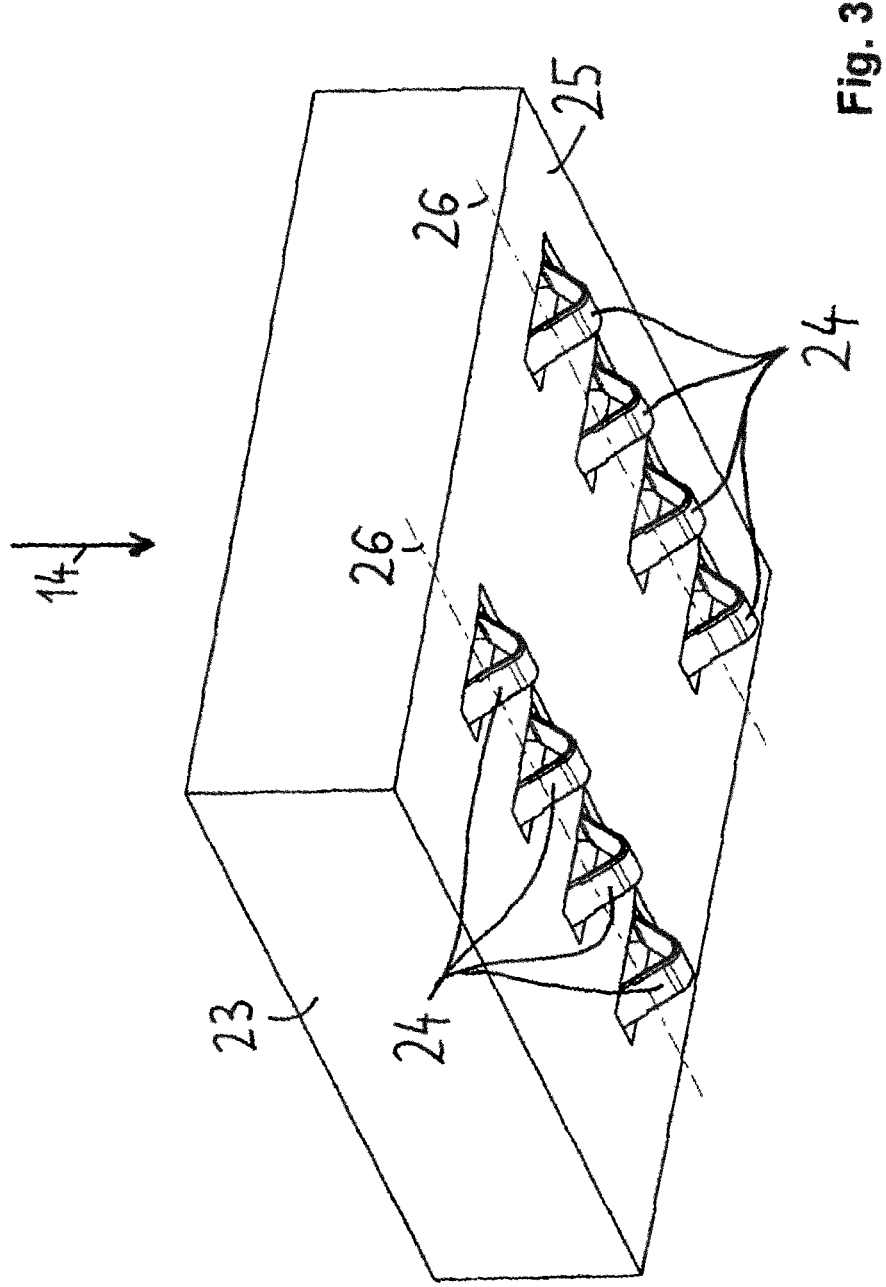
FIG. 3 is a perspective view of one embodiment of a connector module with a plurality of contact elements disposed at a bottom of the connector module.

In FIG. 3, the connector module 23 is shown in more detail. The connector module 23 is implemented as a self-contained connector module that is configured for being fixed at the connector block 21. The connector module 23 includes a plurality of spring contact elements 24. With regard to the vertical direction 14, the contact portions of the spring contact elements 24 are disposed on the bottom surface of the connector module 23. For example, the contact portions of the spring contact elements 24 may protrude from the connector face 25 of the connector module 23. The spring contact elements 24 of the connector module 23 are configured for contacting the contact elements 13 of the insertion part 4 from above when the insertion part 4 is inserted into the insertion slot 18. By disposing the connector module 23 above the insertion slot 18, dirt particles are prevented from entering into the connector module 23, and accordingly, a contamination of the connector module 23 is avoided. When the insertion part 4 is inserted into the insertion slot 18, the contact elements 13 are moved relative to the spring contact elements 24, and due to a slight amount of abrasion, both the spring contact elements 24 and the contact elements 13 are cleaned. In addition, the spring contact elements 24 are resiliently deformed when the insertion part 4 is inserted into the insertion slot 18, which further improves the electric connections. The spring contact elements 24 may include signal contact elements as well as shield contact elements. In one embodiment, the contact elements are arranged along a plurality of rows 26.

Figure 4:
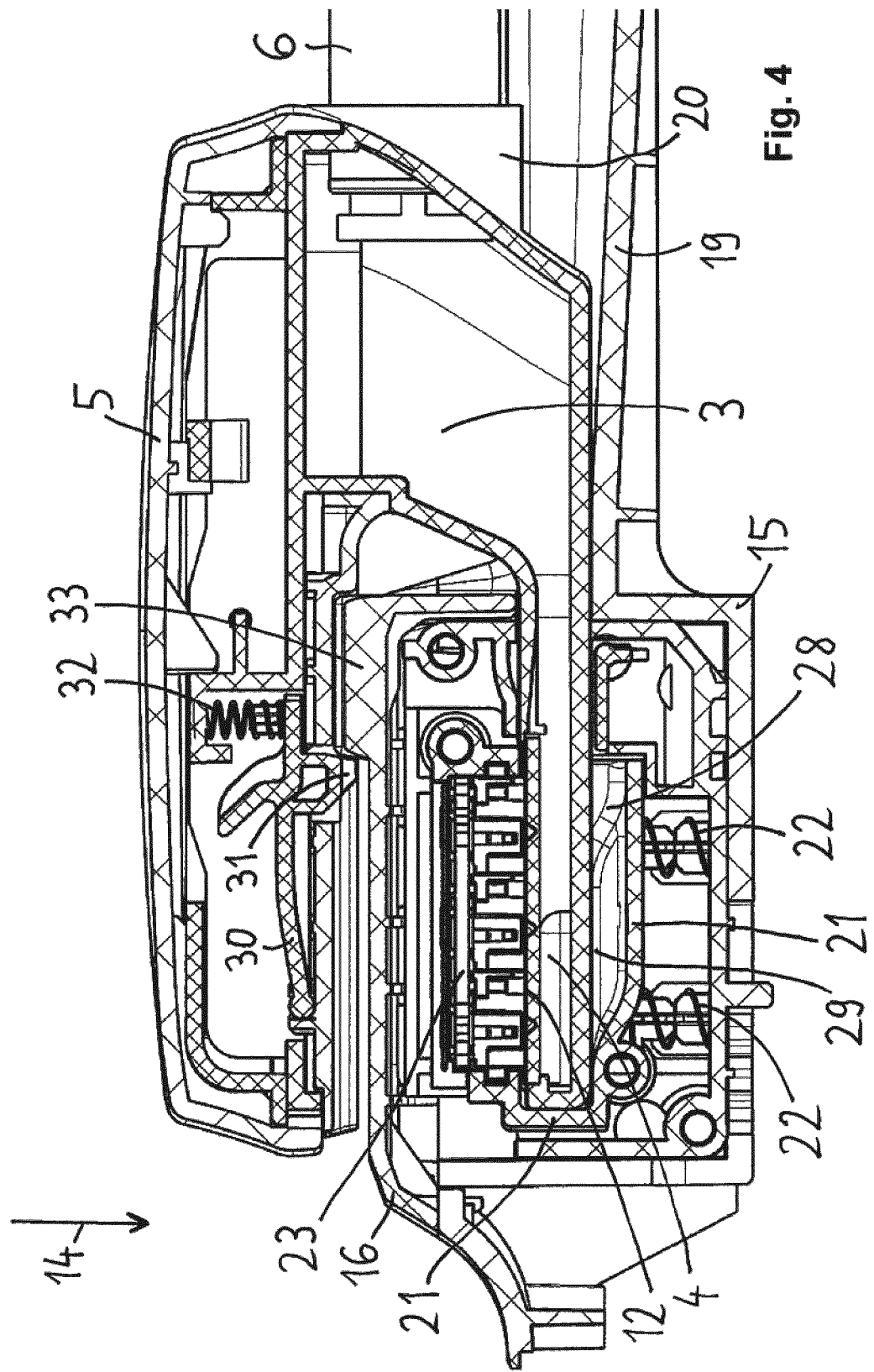
FIG. 4 is a longitudinal section of one embodiment of the plug-type connector part and the socket-type connector part in the plugged-in stated.

The connector block 21 rests on the coil springs 22. The coil springs 22 are configured for exerting a spring force on the connector block 21 in an upward direction, as indicated by arrow 27. The connector block 21 includes a slanted approach surface 28 located on a side of the insertion slot 18 that is opposite to the connector module 23. The slanted approach surface 28 is configured for guiding the insertion part 4 into the insertion slot 18 when the plug-type connector part 1 is plugged into the socket-type connector part 2. When the insertion part 4 is inserted into the insertion slot 18, the slanted approach surface 28 is pressed against the insertion part 4 by the coil springs 22. Because of the interaction of the slanted approach surface 28 with the insertion part 4, the connector block 21 with the connector module 23 is pushed in a downward direction and the coil springs 22 are compressed. As shown in FIG. 4, the resiliently mounted connector block 21 is repositioned relative to the insertion part 4. Thus, the resiliently mounted connector block 21 may adapt to the position of the insertion part 4. After the insertion part 4 has been inserted into the insertion slot 18, the insertion part 4 rests on the support surface 29 of the connector block 21.

As shown in FIGS. 2 and 4, a snap-in hook 30 is disposed inside the handle 5, with a projection 31 of the snap-in hook 30 protruding from the face of the handle 5 that is located opposite of the insertion part 4. A coil spring 32 is configured for pushing the snap-in hook 30 in a downward direction such that the projection 31 of the snap-in hook 30 protrudes from a bottom surface of the handle 5 that is located opposite of the insertion part 4.

The socket-type connector part 2 includes a protrusion 33 mounted on the upper cover 16. When the plug-type connector part 1 is plugged into the socket-type connector part 2, the projection 31 of the snap-in hook 30 slides along the outer contour of the protrusion 33. As soon as the plug-type connector part 1 reaches a final position, which is shown in FIG. 4, the projection 31 of the snap-in hook 30 snaps in behind the protrusion 33, thereby locking the plug-type connector part 1 in the final position. In this position, as shown in FIG. 4, a plurality of electrical connections are established between the spring contact elements 24 of the connector module 23 and the contact elements 13 of the insertion part 4.

The plug-in connector may, for example, be used in the field of medical imaging (e.g., in the field of medical resonance imaging). FIG. 5 shows one embodiment of a magnetic resonance imaging arrangement including local coil 100 and a magnetic resonance imaging device 300. The magnetic resonance imaging device 300 includes a main magnet unit 301 for applying a magnetic field, a gradient unit 302 for applying pulses gradient pulses, and a radio frequency unit 303 for applying radio frequency pulses to a patient P. Thus, magnetic resonance signals are generated. The patient P is positioned on a patient table 201 of a patient positioning device 200.

The local coil 100 includes a plug-type connector part 1 as shown with a cable 6. A socket-type connector part 2 is mounted on the patient table 201. The plug-type connector part 1 and the socket-type connector part 2 form a plug-in connector as shown in FIGS. 1 to 4. The local coil 100 is configured to receive the generated magnetic resonance signals that may be transmitted via a plug-in connector for further processing.

In one embodiment, the socket-type connector part 2 is arranged at the patient positioning device 200 so that the connector module 23 is located above the insertion slot 18. In one embodiment, the socket-type connector part 2 is arranged at the patient positioning device 200 so that the connector module 23 is pushed in a downward direction (e.g., in the direction of gravity G) when the plug-type connector part 1 is plugged into the socket-type connector part 2 and the insertion part 4 is accommodated in the insertion slot 18. Therefore, even if a liquid enters the insertion slot 18 accidentally, this will cause no short circuits at the connector module 23. Hence, a supply voltage may be applied to the connector module 23 continuously in a safe manner. Thus, a control for switching the supply voltage is not necessary.

Figure 6:
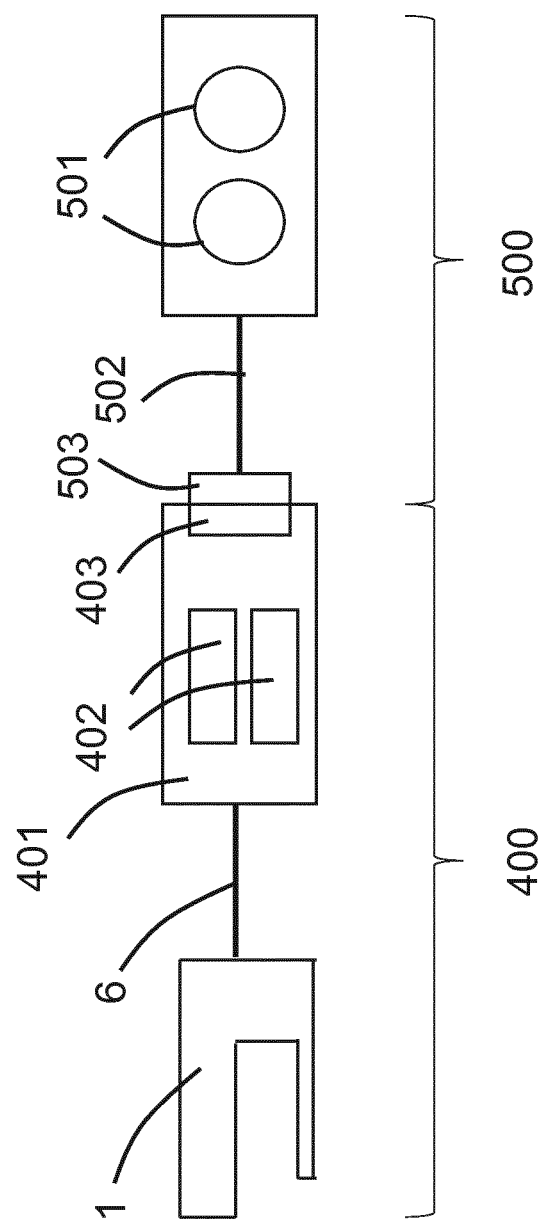
FIG. 6 is a schematic depiction of one embodiment of an amplification device connected to a local coil.

A local coil may be connected to the magnetic resonance imaging device 300 not directly but via an amplification device. An exemplary arrangement is depicted in FIG. 6. An amplification device 400 includes a plug-type connector part 1 as described above, a cable 6 connected to the plug-type connector part 1, and an amplification unit 401 connected to the cable 6. The amplification device 400 may be connected to a local coil 500 via an interface. Therefore, the amplification device 400 includes a first interface part 403 that may be connected to a second interface part 503 of the local coil 500. The local coil 500 includes two antenna elements 501 (e.g., the local coil 500 is a two-channel local coil). The number of channels may be more or less than two (e.g., 4, 8, 16, 32, 64). Each of the antenna elements 501 is configured to receive magnetic resonance signals. These two signals may be transmitted via a cable 502, the second interface 503, and the first interface 403 to the amplification unit 401. The amplification unit 401 includes, for each of the two channels, an amplifier 402 for amplifying each of the transmitted signals separately. The amplified signals may be transmitted to the magnetic resonance imaging device 300 via the plug-type connector part 1.

The elements and features recited in the appended claims may be combined in different ways to produce new claims that likewise fall within the scope of the present invention. Thus, whereas the dependent claims appended below depend from only a single independent or dependent claim, it is to be understood that these dependent claims may, alternatively, be made to depend in the alternative from any preceding or following claim, whether independent or dependent. Such new combinations are to be understood as forming a part of the present specification.

While the present invention has been described above by reference to various embodiments, it should be understood that many changes and modifications can be made to the described embodiments. It is therefore intended that the foregoing description be regarded as illustrative rather than limiting, and that it be understood that all equivalents and/or combinations of embodiments are intended to be included in this description.

The invention claimed is:

1. A plug-type connector part comprising:
    a rear part enclosed within a housing;
    an insertion part extending from the rear part in a mating direction of the plug-type connector part, the insertion part having a first side comprising a plurality of contact elements, and a second side opposite the first side comprising an extension of the housing attached to or integrally formed with the housing of the rear part,
    wherein the second side is configured for sliding engagement without contact of the plurality of contact elements on the insertion part; and
    a handle element attached to or integrally formed with the rear part,
    wherein the handle element is located opposite of the insertion part and faces the insertion part, with an interspace between the handle element and the insertion part,
    wherein the handle element is configured to be gripped by a user, such that, via the handle element, the plug-type connector part is movable into a socket-type connector part and connectable to the socket-type connector part.

2. The plug-type connector part of claim 1, wherein the handle element, the rear part, and the insertion part form a C-shape.

3. The plug-type connector part of claim 1, wherein the handle element extends from the rear part in a direction that deviates from the mating direction by at most 20°.

4. The plug-type connector part of claim 1, wherein the handle element extends in parallel to the insertion part.

5. The plug-type connector part of claim 1, wherein the insertion part comprises a contact face with contact elements, and
wherein the contact face is disposed on a side of the insertion part that is located opposite of the handle element.

6. The plug-type connector part of claim 1, wherein the rear part housing is integrally molded with the second side of the insertion part, such that of the rear part housing and the second side of the insertion part form an outer surface of the plug-type connector part.

7. A plug-in connector comprising:
a plug-type connector part comprising:
a rear part;
an insertion part attached to or integrally formed with the rear part, the insertion part extending from the rear part in a mating direction of the plug-type connector part, the insertion part comprising a plurality of contact elements; and
a handle element attached to or integrally formed with the rear part, wherein the handle element is located opposite of the insertion part and faces the insertion part, with an interspace between the handle element and the insertion part; and
a corresponding socket-type connector part, the plug-type connector part being pluggable into the corresponding socket-type connector part, the corresponding socket-type connector part comprising:
an insertion slot, the insertion slot being configured for taking in the insertion part of the plug-type connector part when the plug-type connector part is plugged into the corresponding socket-type connector part; and
a connector module with a plurality of contact elements, the connector module being arranged adjacent the insertion slot,
wherein the plurality of contact elements of the connector module are configured to establish electrical connections with corresponding contact elements of the insertion part when the plug-type connector part is plugged into the corresponding socket-type connector part and the insertion part is accommodated in the insertion slot,
wherein the connector module is located above the insertion slot,
wherein the connector module is configured to move in a direction transverse to the mating direction when the plug-type connector part is plugged into the socket-type connector part and the insertion part is accommodated in the insertion slot.

8. The plug-in connector of claim 7, wherein the corresponding socket-type connector part further comprises a connector block and springs, the connector block comprising the connector module and the insertion slot, and
wherein the connector block rests on the springs, such that the springs are configured to exert a spring force on the connector block in an upward direction.

9. A plug-in connector comprising:
a plug-type connector part; and
a corresponding socket-type connector part, wherein the plug-type connector part is configured for being plugged into the corresponding socket-type connector part in a mating direction, the socket-type connector part comprising:
an insertion slot configured for taking in an insertion part of the plug-type connector part when the plug-type connector part is plugged into the corresponding socket-type connector part; and
a connector module with a plurality of contact elements, the connector module being arranged adjacent the insertion slot, wherein the plurality of contact elements of the connector module are configured for establishing electrical connections with corresponding contact elements of the insertion part when the plug-type connector part is plugged into the corresponding socket-type connector part and the insertion part is accommodated in the insertion slot,
wherein the corresponding socket-type connector part comprises a connector block, the connector block comprising the connector module and the insertion slot,
wherein the connector block comprises a slanted approach surface connected to the connector module and supported by a spring element, the slanted approach surface being configured to be depressed transverse to the mating direction when the insertion part is inserted into the insertion slot.

10. The plug-in connector of claim 9, wherein the slanted approach surface is located below the insertion slot.

11. The plug-in connector of claim 9, wherein the socket-type connector part and a handle element of the plug-type connector part are configured such that the handle element is disposed outside of the corresponding socket-type connector part when the plug-type connector part is plugged into the corresponding socket-type connector part.

12. The plug-in connector of claim 9, wherein the corresponding socket-type connector part comprises a feeding element, and
wherein when viewed in the mating direction of the plug-type connector part, the feeding element is arranged in front of the insertion slot and is configured for guiding the insertion part into the insertion slot.

13. The plug-in connector of claim 9, wherein the corresponding socket-type connector part further comprises springs, and
wherein the connector block rests on the springs, such that the springs are configured to press the slanted approach surface against the insertion part from below the slanted approach surface.

14. A socket-type connector part comprising:
an insertion slot, the insertion slot being configured for taking in an insertion part of a plug-type connector part when the plug-type connector part is plugged into the socket-type connector part in a mating direction;
a connector module with a plurality of contact elements, the connector module being arranged adjacent the insertion slot, wherein the plurality of contact elements of the connector module are configured for establishing electrical connections with corresponding contact elements of the insertion part when the plug-type connector part is plugged into the socket-type connector part and the insertion part is accommodated in the insertion slot; and
a feeding element, wherein when viewed in a mating direction of the plug-type connector part being configured for being plugged into the socket-type connector part, the feeding element is arranged in front of and below the insertion slot and is configured for slidably receiving and guiding the insertion part into the insertion slot,
wherein the feeding element has a semitube- or basin-like shape.

15. The socket-type connector part of claim 14, wherein the plurality of contact elements are inaccessible by a human body part.

16. The socket-type connector part of claim 14, wherein the feeding element comprises a concave protrusion extending in front of and below the insertion slot, and lateral guides extending from opposite sides of the insertion slot, such that the feeding element has the basin-like shape.

17. A local coil for a magnetic resonance imaging device, the local coil comprising:
- a plug-type connector part comprising:
  - a rear part enclosed within a housing;
  - an insertion part extending from the rear part in a mating direction of the plug-type connector part, the insertion part having a first side comprising a plurality of contact elements, and a second side opposite the first side comprising an extension of the housing attached to or integrally formed with the housing of the rear part,
  wherein the second side is configured for sliding engagement without contact of the plurality of contact elements on the insertion part; and
  - a handle element attached to or integrally formed with the rear part,
  wherein the handle element is located opposite of the insertion part and faces the insertion part, with an interspace between the handle element and the insertion part,
  wherein the handle element is configured to be gripped by a user, such that, via the handle element, the plug-type connector part is movable into a socket-type connector part and connectable to the socket-type connector part.

18. A magnetic resonance imaging arrangement comprising:
- a local coil connected to a plug-type connector part; and
- a magnetic resonance imaging device connected to a socket-type connector part,
wherein the plug-type connector part and the socket-type connector part form a plug-in connector, the plug-in connector comprising:
  - the plug-type connector part comprising:
    - a rear part enclosed within a housing;
    - an insertion part extending from the rear part in a mating direction of the plug-type connector part, the insertion part having a first side comprising a plurality of contact elements, and a second side opposite the first side comprising an extension of the housing attached to or integrally formed with the housing of the rear part,
    wherein the second side of the insertion part is configured for sliding engagement without contact of the plurality of contact elements on the insertion part; and
    - a handle element attached to or integrally formed with the rear part, wherein the handle element is located opposite of the insertion part and faces the insertion part, with an interspace between the handle element and the insertion part,
    wherein the handle element is configured to be gripped by a user, such that, via the handle element, the plug-type connector part is movable into a socket-type connector part and connectable to the socket-type connector part; and
  - the socket-type connector part, the plug-type connector part being pluggable into the socket-type connector part, the socket-type connector part comprising:
    - an insertion slot, the insertion slot being configured for taking in the insertion part of the plug-type connector part when the plug-type connector part is plugged into the socket-type connector part; and
    - a connector module with a plurality of contact elements, the connector module being arranged adjacent the insertion slot,
    wherein the plurality of contact elements of the connector module are configured to establish electrical connections with corresponding contact elements of the insertion part when the plug-type connector part is plugged into the socket-type connector part and the insertion part is accommodated in the insertion slot.

19. A plug-in connector comprising:
- a plug-type connector part comprising:
  - a rear part;
  - an insertion part attached to or integrally formed with the rear part, the insertion part extending from the rear part in a mating direction of the plug-type connector part, the insertion part having a first side comprising a plurality of contact elements; and
  - a handle element attached to or integrally formed with the rear part, wherein the handle element is located opposite of the insertion part and faces the insertion part, with an interspace between the handle element and the insertion part; and
- a corresponding socket-type connector part, the plug-type connector part being pluggable into the corresponding socket-type connector part,
wherein the handle element of the plug-type connector part is configured to be gripped by a user as and when the insertion part of the plug-type connector part is slidingly engaged with the corresponding socket-type connector part.

* * * * *